United States Patent
Cipriani (10) Patent No.: US 11,679,942 B2
(45) Date of Patent: Jun. 20, 2023

(54) METHOD AND APPARATUS FOR TRANSFERRING ITEMS FROM AND TO A TRANSPORT LINE

(71) Applicant: FT SYSTEM SRL, Alseno (IT)

(72) Inventor: Marco Cipriani, Alpignano (IT)

(73) Assignee: FT SYSTEM SRL, Alseno (IT)

( * ) Notice: Subject to any disclaimer, the term of this patent is extended or adjusted under 35 U.S.C. 154(b) by 597 days.

(21) Appl. No.: 16/626,945

(22) PCT Filed: Jun. 28, 2018

(86) PCT No.: PCT/IB2018/054797
§ 371 (c)(1),
(2) Date: Dec. 27, 2019

(87) PCT Pub. No.: WO2019/003170
PCT Pub. Date: Jan. 3, 2019

(65) Prior Publication Data
US 2020/0172349 A1    Jun. 4, 2020

(30) Foreign Application Priority Data
Jun. 28, 2017 (IT) .......... 102017000072654

(51) Int. Cl.
*B65G 47/90* (2006.01)
*B25J 9/00* (2006.01)
(Continued)

(52) U.S. Cl.
CPC .......... *B65G 47/90* (2013.01); *B25J 9/0093* (2013.01); *B65G 43/08* (2013.01); *B65G 47/52* (2013.01);
(Continued)

(58) Field of Classification Search
CPC ........ B65G 47/90; B65G 43/08; B65G 47/52; B65G 2201/0244; B65G 2203/041; B65G 47/904; B25J 9/0093
See application file for complete search history.

(56) References Cited

U.S. PATENT DOCUMENTS 3,951,283 A * 4/1976 Lingl, Jr. ............... B65G 57/22
414/931
6,575,305 B1 6/2003 Casagrande
(Continued)

FOREIGN PATENT DOCUMENTS

EP 2479123 A1 7/2012
JP H01-134263 A 5/1989

OTHER PUBLICATIONS

International Search Report and Written Opinion of the International Searching Authority dated Sep. 13, 2018 for International Patent Application No. PCT/IB2018/054797.

*Primary Examiner* — Lynn E Schwenning
(74) *Attorney, Agent, or Firm* — Howson & Howson LLP (57) ABSTRACT

The present invention relates to a method and an apparatus (1) for transferring items from and to a transport line (100), more particularly a transport line moving at high speed. The invention comprises the steps of picking a first item (10a) from a transport line (100) and placing a second item (10b) onto said transport line, preferably at an immediately subsequent time, into the gap left by said first item that has just been picked. The invention is applied in particular, but not exclusively, in the field of item packaging, for instance in bottling systems. More particularly, the invention can be used for transferring items to be checked from a transport line to an inspection station, and for transferring back items that have been checked and deemed satisfactory from said inspection station to said transport line.

9 Claims, 4 Drawing Sheets

(51) Int. Cl.
*B65G 43/08* (2006.01)
*B65G 47/52* (2006.01)

(52) U.S. Cl.
CPC ............... *B65G 2201/0244* (2013.01); *B65G 2203/041* (2013.01)

(56) References Cited

U.S. PATENT DOCUMENTS

| | | |
|---|---|---|
| 9,340,372 B2 | 5/2016 | Makino et al. |
| 9,387,992 B2* | 7/2016 | Boschi ................. B65G 47/904 |
| 9,611,102 B2* | 4/2017 | Job ........................ B65G 47/71 |
| 9,840,375 B2 | 12/2017 | Robert et al. |
| 9,856,092 B2* | 1/2018 | Job ........................ B65G 47/29 |
| 2004/0020747 A1 | 2/2004 | Monti |
| 2004/0073333 A1* | 4/2004 | Brill ........................... B07C 3/08 700/224 |
| 2012/0039699 A1* | 2/2012 | Ward ..................... B65G 57/26 414/590 |
| 2014/0125796 A1* | 5/2014 | Kurosawa ............. B07C 5/3408 348/127 |
| 2018/0148309 A1 | 5/2018 | Gabusi et al. |

* cited by examiner

METHOD AND APPARATUS FOR TRANSFERRING ITEMS FROM AND TO A TRANSPORT LINE

TECHNICAL FIELD

The present invention relates to a method and an apparatus for transferring items from and to a transport line, more particularly a transport line moving at high speed.

The present invention is applied in particular, but not exclusively, in the field of item packaging, for instance in bottling systems.

PRIOR ART

In the field of item packaging, systems are known and widespread in which the items to be packaged are made to advance in line along a transport line comprising one or more conveyor belts moving through a succession of working stations, inside which said items undergo the different operations required for their packaging.

For instance, in case of bottling systems, the bottles are made to advance in line along a transport line passing through a succession of working stations, including for instance a filling station, a capping station, a labelling station and so on.

In most working stations, all items that are made to advance along the transport line undergo the same operations.

Yet, situations exist in which only some of the items being conveyed undergo specific operations, This is for instance the case of quality control stations, in which only some items are selected in spot manner and undergo specific checks. In such inspection stations, a single item (selected in random manner or according to a predetermined logic) is picked from the transport line and transferred to the apparatuses intended to check whether the item meets the criteria set by the regulations in force and/or internal standards of the manufacturer. As a consequence of the checks carried out, items that are not deemed satisfactory can be discarded.

In known packaging systems, the existence of inspection stations of the kind described above (or of other stations to which only a limited sample of items is transferred for undergoing specific operations) raises a number of problems.

First, the known packaging systems are not provided with means for effectively reintroducing onto the transport line the items that are deemed satisfactory as a consequence of the checks carried out in the inspection stations.

More particularly, it is to be taken into account that the productivity of the systems depends on the number of items packaged per time unit. Consequently, in order to maintain a high productivity, it is desirable to make the items to be packaged advance as close as possible to each other and at a speed as high as possible. This makes reintroducing the items onto the transport line particularly complex.

Actually, since the items advance close to each other and at a high speed, reintroducing an item into a proper position and without perturbing the advance of the other items (and hence the production flow) may be extremely complex.

Devices (buffers) are known enabling reintroducing the transported items, but such devices are cumbersome, are not suitable for transport lines moving at high speed and do not allow maintaining a correlation with the upstream operating sequence.

Documents JP-H-1-134263 and EP 2720028 disclose packaging systems comprising one or more inspection stations arranged along a transport line, means for picking one or more items from said transport line and transferring them to an inspection station, and means for reintroducing the items that have been inspected and deemed satisfactory onto said transport line.

Yet, the transferring means disclosed in the above documents do not seem capable of picking/reintroducing items advancing in line and close to each other on a transport line moving at high speed.

It is a main object of the present invention to overcome the drawbacks of the prior art, by providing a method and an apparatus that enable picking/reintroducing items advancing in line and close to each other on a transport line moving at high speed.

It is another object of the present invention to provide a method and an apparatus that enable picking/reintroducing items advancing on a transport line of a system in such a manner that the production flow of said system is not perturbed and the risk of failures and malfunctioning is minimised.

The above and other objects are achieved by a method and an apparatus for transferring items from and to a transport line as claimed in the appended claims.

BRIEF DISCLOSURE OF THE INVENTION

The method according to the invention comprises the steps of picking a first item from a transport line and placing a second item, preferably of the same kind, onto said transport line, into the gap left by said first item.

More specifically, the invention comprises the steps of picking a first item from a transport line and placing a second item, preferably of the same kind, onto said transport line, into the gap left by said first item, at an immediately subsequent time.

More particularly, in case of application to an inspection station in a packaging system, the method according to the invention comprises the steps of picking a first item to be inspected from a transport line and, at an immediately subsequent time, placing onto said transport line, into the gap left by said first item, a second item of the same kind that has been already inspected and deemed satisfactory.

Thanks to the method according to the invention, the items that have been inspected in said inspection station and deemed satisfactory are reintroduced onto the transport line substantially at the same position where they have been picked, and they resume advancing onto the transport line from said position.

Thanks to the method according to the invention, no discontinuity is created in the line of products advancing onto the transport line downstream of said inspection station, and this allows maintaining the high productivity and reducing the risk of failures and malfunctioning.

Correspondingly, the apparatus according to the invention comprises a transferring device provided with first engaging elements designed for selectively engaging/releasing a first item and with second engaging elements designed for selectively engaging/releasing a second item.

The transferring device is carried by a supporting arm, which in turn is carried by a base body so as to be movable in at least two different directions. First, said supporting arm can be displaced in a direction substantially parallel to the advance direction of the transport line at the location of the apparatus according to the invention, synchronously with said transport line, so that the transferring device can be maintained at the same position of the transport line during the operations of picking the first item from said transport line and reintroducing the second item onto said transport line. Second, said supporting arm can be displaced in a direction transverse to the advance direction of the transport line at the location of the apparatus according to the invention, so that at a first time the first engaging elements of the transferring device can be kept in alignment with the transport line for picking the first item from said transport line and, subsequently, at a second time, the second engaging elements of said transferring device can be brought into alignment with the transport line for reintroducing the second item onto said transport line Advantageously, said supporting arm is also movable in a third direction, perpendicular to the plane on which the transport line advances, whereby it can be lifted/lowered relative to the transport line.

Advantageously, the apparatus according to the invention can be provided with a sensor intended to signal the passage of the items on the transport line to the apparatus, and more particularly to signal the passage of an item to be picked to the apparatus and, consequently, to start the operating sequence of said apparatus.

Advantageously, the apparatus according to the invention can also be provided with a detecting device located along the transport line and arranged to detect the position and/or the speed of said transport line, thereby enabling synchronisation of the supporting arm of said apparatus with said transport line

BRIEF DESCRIPTION OF THE FIGURES

A preferred embodiment of the invention will be described hereinafter by way of non-limiting example with reference to the accompanying Figures, in which.

DETAILED DESCRIPTION OF A PREFERRED EMBODIMENT OF THE INVENTION

In the embodiment described hereinafter, reference will be made to an application of the method and the apparatus according to the invention to a bottling system, and more particularly to an inspection station of a bottling system. Yet, in no way such an application is to be intended in a limiting sense, and the invention can be applied in all situations where it is necessary or desirable to pick items from a transport line and to reintroduce items onto said transport line, more particularly when said transport line moves at high speed.

Figure 1:
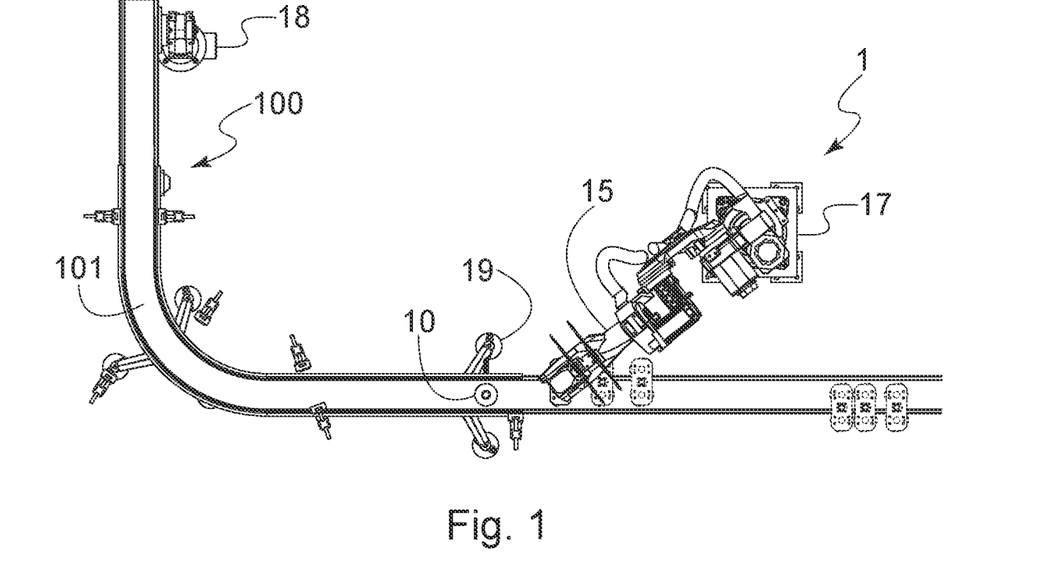
FIG. 1 schematically shows, in a top view, a portion of a transport line of a packaging system and the apparatus according to the invention located along said portion of said transport line.

Referring first to FIG. 1, there is schematically shown a portion of a transport line 100 of a bottling system, comprising a conveyor belt 101 on which bottles 10 of plastic material (e.g. PET) advance in line and close to each other.

In such systems, in order to maintain a high productivity, the advance speed of bottles 10 on transport line 100 is very high, up to and beyond 70,000 bottles per hour.

In a manner known per se, the working stations of the bottling system, inside which the bottles undergo the desired operations (filling, capping, labelling and so on), are located along transport line 100.

More particularly, along transport line 100 an inspection station (not shown) can be provided, where a limited number of bottles, selected in spot manner (at random or according to a predetermined logic), undergo a number of checks in order to verify their conformity with predetermined quality standards.

The present invention comprises the steps of transferring the bottles selected for being inspected from conveyor belt 101 of transport line 100 to the inspection station, and transferring the bottles that have been inspected and deemed satisfactory from said inspection station to said conveyor belt of said transport line.

More particularly, the invention comprises the steps of picking a first bottle to be inspected from transport line 100 in order to transfer it to the inspection station, and reintroducing a second bottle that has been already inspected in the inspection station and deemed satisfactory onto said transport line, into the gap left by said first bottle that has just been picked. Even more particularly, the invention comprises the steps of picking a first bottle to be inspected from transport line 100 and reintroducing a second bottle that has been already inspected and deemed satisfactory onto said transport line, at an immediately subsequent time, into the gap left by said first bottle that has just been picked.

Said invention is implemented by means of apparatus 1 shown in FIG. 1.

Figure 2:
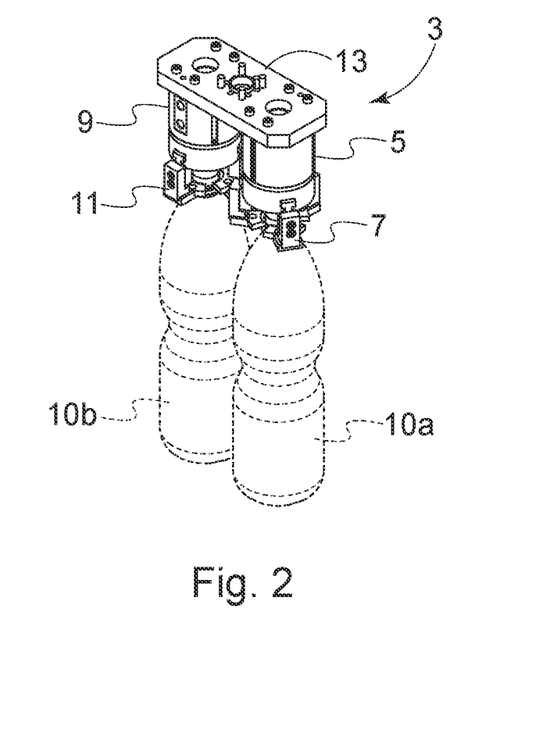
FIG. 2 shows in detail the transferring device of the apparatus according to the invention.

Said apparatus 1 comprises a transferring device 3, shown in greater detail in FIG. 2.

Transferring device 3 is provided with first engaging elements 5 designed for selectively engaging/releasing a first bottle 10a. For instance, in the embodiment illustrated, the first engaging elements 5 include first pliers 7, which can be closed in order to tighten about the neck of said first bottle 10a or can be opened to release the neck of said first bottle 10a. Transferring device 3 is also provided with second engaging elements 9 designed for selectively engaging/releasing a second bottle 10b. In the embodiment illustrated, the second engaging elements 9 include second pliers 11, which can be closed in order to tighten about the neck of said second bottle 10b or can be opened to release the neck of said second bottle 10b.

It is to be appreciated that, even if in the embodiment illustrated the first and the second engaging elements 5, 9 are provided with pliers engaging the neck of the bottles (in particular, below the neck ledge), such a configuration is not limiting, and it is possible to think of engaging elements provided with means arranged to engage other parts of the bottle (e.g., the cap or the neck).

Actuators of any kind and sort, well in the reach of the person skilled in the art (for instance hydraulic actuators or pneumatic actuators), can be used to make the first and second pliers 7, 11 switch from their engagement configuration to the release configuration, and vice versa.

The first and the second engaging elements 5, 9 are mounted in line on an interface plate 13.

Turning back to FIG. 1, interface plate 13 is in turn secured to a supporting arm 15, more particularly a robotic supporting arm, carried by a base body 17.

Supporting arm 15 is carried by said base body 17 so as to be movable at least in two different directions on a plane parallel to the plane on which transport line 100 advances.

More particularly, said supporting arm 15 can be displaced in a first direction substantially parallel to the advance direction of transport line 100 at the location of apparatus 1 according to the invention. More particularly, said supporting arm 15 can be displaced in a first direction substantially parallel to the advance direction of transport line 100 synchronously with the advance of transport line 100.

In this way, transferring device 3 carried by supporting arm 15 can be kept substantially at the same point of conveyor belt 101 while said conveyor belt is advancing at high speed.

Moreover, supporting arm 15 can be displaced in a second direction transverse to the advance direction of transport line 100 at the location of apparatus 1 according to the invention.

In this way, supporting arm 15 can be moved from a first position, in which the first engaging elements 5 of transferring device 3 are aligned with transport line 100 for picking a first bottle from said transport line, to a second position in which the second engaging elements 9 of said transferring device 3 are aligned with transport line 100 for reintroducing a second bottle onto said transport line, into the gap left by said first bottle.

Supporting arm 15 will also be movable in a third direction perpendicular to the plane on which transport line 100 lies, in order to be lowered relative to said transport line for engaging said first bottle to be picked from the transport line and to be lifted relative to said transport line after having released said second bottle to be reintroduced onto the transport line.

Actuators of any kind and sort, well in the reach of the person skilled in the art (for instance hydraulic actuators or pneumatic actuators) can be used to move supporting arm 15.

Apparatus 1 will further comprise a controller for controlling the movements of supporting arm 15, as well as for controlling switching of the first and second engaging elements 5, 9 from their engaging position to their releasing position, and vice versa.

In order to synchronise the movements of supporting arm 15 with transport line 100, apparatus 1 will preferably be equipped with a detecting device 18 (e.g. an encoder), preferably located upstream of said apparatus in the direction of advance of the transport line, capable of detecting the position and/or the speed of transport line 100 and of transmitting the detected data to the controller of said apparatus 1.

Moreover, in order to properly control switching of the first and the second engaging elements 5, 9 from their engaging position to their releasing position and vice versa, apparatus 1 will preferably be equipped with a sensor 19, capable of detecting the passage of the bottles conveyed by said transport line and of transmitting such information to the controller of said apparatus 1.

In the embodiment illustrated, said sensor 19 (e.g. a photocell) is located along the transport line, upstream of said apparatus in the direction of advance of the transport line and at a known distance from said apparatus. Yet, in alternative embodiments of the invention, said sensor could be installed on the apparatus itself (e.g., it could be a video camera installed on supporting arm 15 or base body 17).

It will be apparent to the person skilled in the art that detecting device 18 and sensor 19 described above are not to be intended in a limiting sense and that any detecting device allowing detecting in real time the speed of the transport line and/or of the items advancing on the same line and the position of said items can be used.

Similarly, any identification device suitable to identify the specific item to be picked from the transport line can be used. Said identification device preferably will allow relating said specific article with its past "history" in the working stations upstream of apparatus 1, so that the checks carried out on said item can be used to perform possible corrections in the calibration of the instruments in said working stations.

The operation of apparatus 1 will now be described with reference to FIGS. 3a to 3e.

Figure 3A:
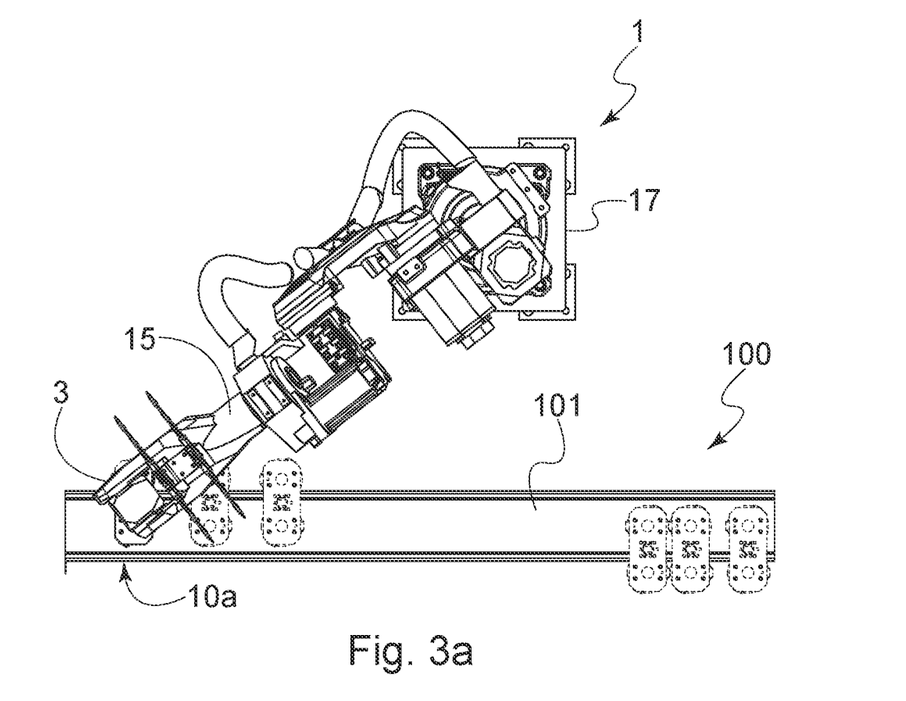
FIGS. 3a to 3e schematically show, in a top view, successive steps of the method according to the invention.

In a first step, depicted in FIG. 3a, apparatus 1 picks a bottle 10b that has been already inspected and deemed satisfactory from the inspection station, and the supporting arm moves from an idle position in the inspection station to a starting position, in which said supporting arm 15 is arranged so that the first engaging elements 5 of transferring device 3 are aligned with transport line 100. Moreoverr, the supporting arm is lifted relative to said transport line so that said first engaging elements 5 are located above the top of the bottles advancing on conveyor belt 101 of transport line 100. In such a first step, pliers 7 of the first engaging elements 5 are in their releasing position and do not carry any bottle, whereas pliers 11 of the second engaging elements 9 are in their engaging position and are tightened about the neck of bottle 10b.

From such a starting position, the supporting arm starts moving in a direction parallel to transport line 100. Thanks to the information coming from encoder 18 and photocell 19, the supporting arm starts moving when bottle 10a to be picked and inspected is aligned below the first engaging elements 5, and moves synchronously with conveyor belt 101 of transport line 100.

Figure 3B:
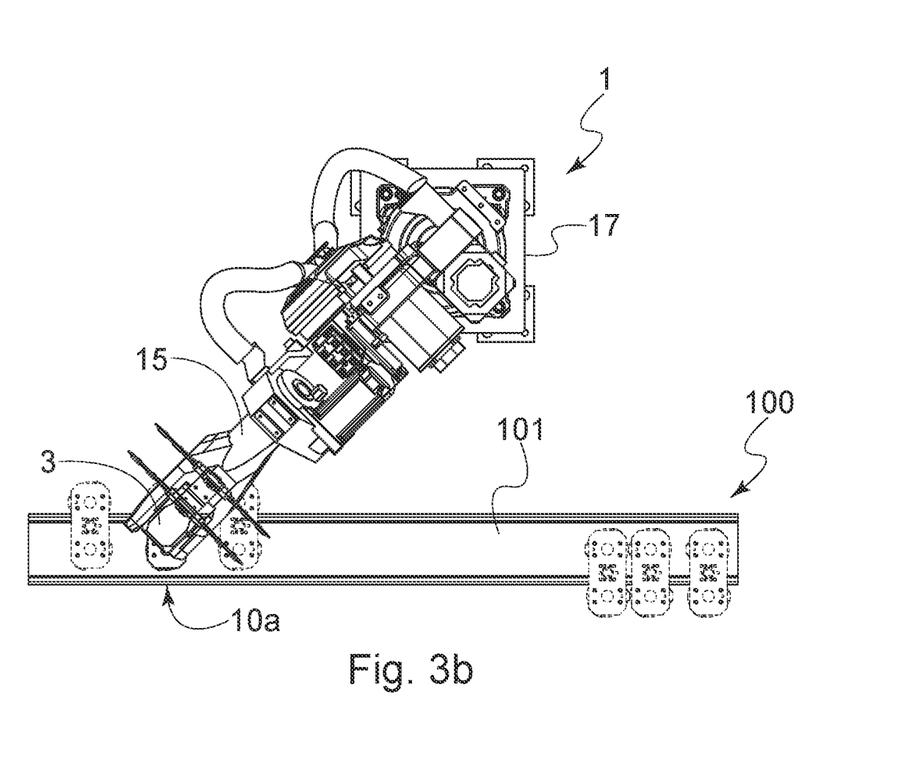

In a second step, depicted in FIG. 3b, the supporting arm, while moving parallel to transport line 100 and synchronously therewith, is lowered relative to said transport line 100, and the first engaging elements 5 of transferring device 3 switch from their releasing position to their engaging position so that the first pliers 7 tighten about the neck of bottle 10a to be picked from the transport line.

Figure 3C:
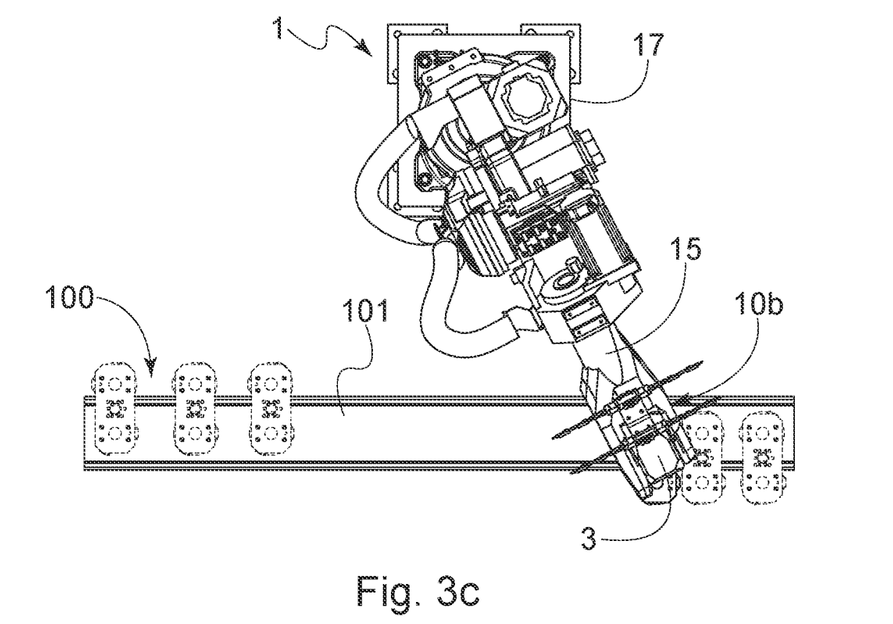

In a third step, depicted in FIG. 3c, supporting arm 15, while continuing moving in a direction substantially parallel to transport line 100 and synchronously therewith, is displaced in a second direction, transversely to transport line 100, so as to bring the second engaging elements 9 of transferring device 3 (and hence bottle 10b to be reintroduced onto the transport line) in alignment with the conveyor belt of said transport line.

Since supporting arm 15 moves synchronously with the transport line, bottle 10b carried by the second engaging elements 9 will exactly occupy the gap left by bottle 10a that has just been picked by the first engaging elements 5.

Figure 3D:
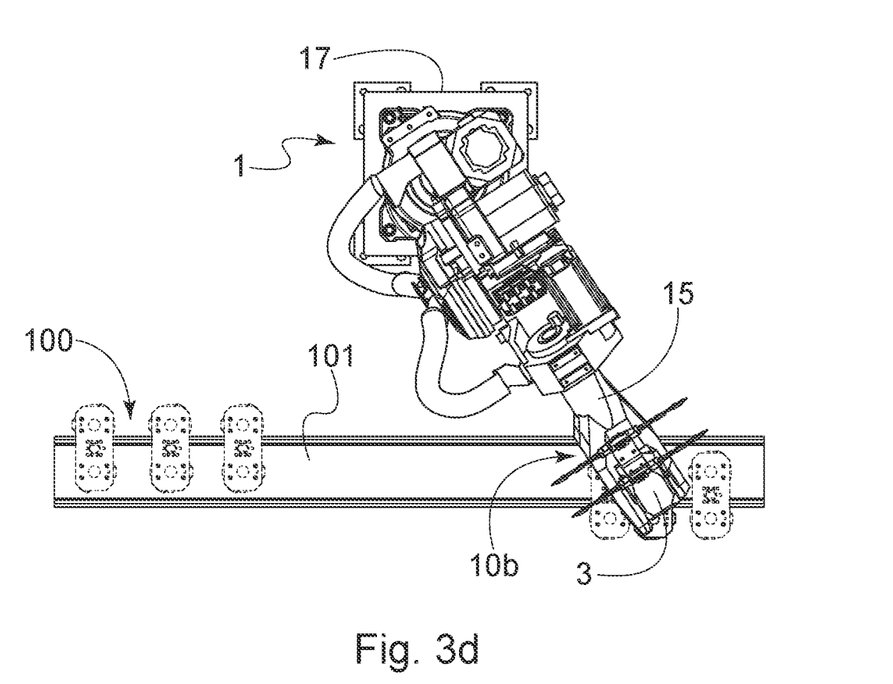

In a fourth step, depicted in FIG. 3d, the second engaging elements 9 of transferring device 3 move from their engaging position to their releasing position in order the second pliers 11 release the neck of bottle 10b to be reintroduced onto the transport line.

Figure 3E:
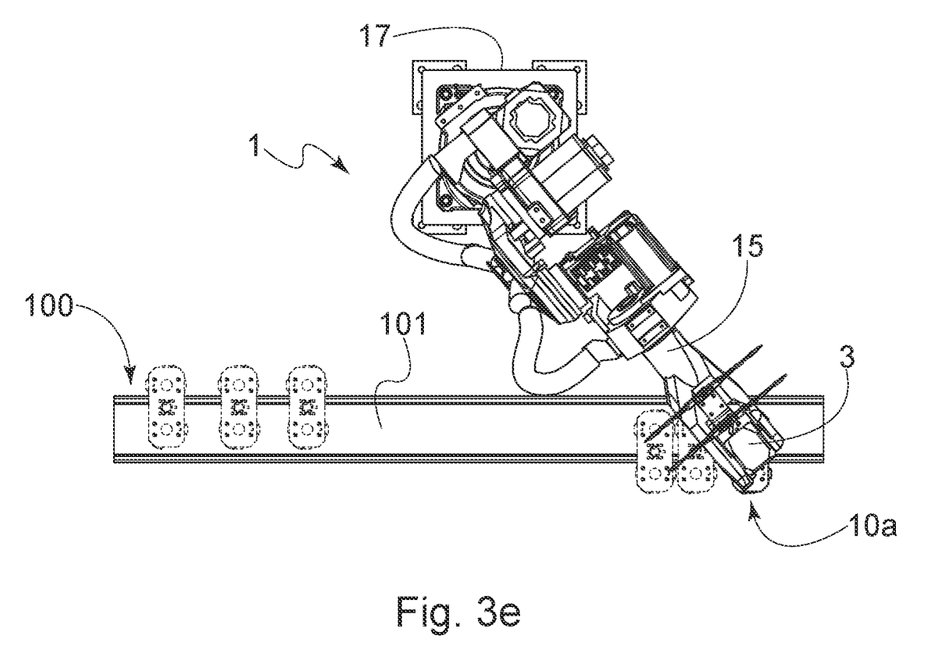

In a fifth and last step, depicted in FIG. 3e, supporting arm 15 is lifted again relative to transport line 100, so as to transfer bottle 10a that has been picked from the transport line to the inspection station without interfering with the advance of the other bottles on transport line 100. During this step, the second pliers 11 of the second engaging elements 9 are in their releasing position and do not carry any bottle, whereas the first pliers 7 of the first engaging elements 5 are in their engaging position and are tightened about the neck of bottle 10a.

From the above description, it is clearly apparent that bottle 10b that had been previously inspected and deemed satisfactory is reintroduced onto transport line 100 into the gap just left by bottle 10a to be inspected, and resumes advancing on transport line 100 substantially from the same position whence it had been previously picked for inspection.

It is also clearly apparent that, thanks to the replacement of bottle 10*a* that has been picked for the inspection with bottle 10*b* that had been previously inspected and deemed satisfactory, the bottles, when leaving the inspection station, are arranged onto the transport line without discontinuities and gaps.

Bottle 10*a* that has been picked from the transport line for being inspected will undergo the specific checks provided for in the inspection station.

To this end, in the embodiment illustrated, said bottle will be released by the first pliers 7 of the first engaging elements 5 of apparatus 1. If, at the end of the checks carried out in the inspection station, the bottle is deemed satisfactory, it will be loaded by apparatus 1 in order to be reintroduced onto the transport line, and to this end it will be seized by the second pliers 11 of the second engaging elements 9 of said apparatus.

In an alternative embodiment, it might be deemed preferable that an item always interacts with the same engaging elements, both during picking from the transport line and during reintroduction onto said transport line. This maybe advantageous, for instance, if the operations to be performed on said item are very simple and can be carried out by keeping the item continuously in engagement with the apparatus according to the invention.

In such an alternative embodiment, it is possible to envisage that the interface plate is mounted on the supporting arm so as to be rotatable by 180° about an axis perpendicular to the plane on which the transport line advances, so that the same engaging elements of the transferring device may be moved, depending on the operating step, to a proximal position or a distal position relative to the transport line.

Should bottle 10*a* picked from the transport line for being inspected be judged unsatisfactory, it will be discarded.

In a particularly simple embodiment of the invention, in such case a bottle that has been subsequently picked from the transport line will not be replaced.

In an alternative embodiment of the invention, a supply of satisfactory bottles could be provided at the inspection station, so that, if bottle 10*a* is discarded, it can be replaced by a bottle taken form said supply. Such a measure advantageously allows avoiding the occurrence of gaps on the transport line downstream of apparatus 1 according to the invention and the occurrence of discontinuities in the bottle line advancing on said transport line.

In a further alternative embodiment of the invention, it could be possible to envisage that also the bottles that have been checked and deemed unsatisfactory are reintroduced onto the transport line, after having been marked in some manner to denote that they are unsatisfactory in respect of one or more specific checks.

From the above description, it will be clearly apparent to the person skilled in the art that the method and the apparatus according to the invention allow effectively achieving the objects stated above.

Moreover, it will be clearly apparent to the person skilled in the art that in no way the embodiment as described and illustrated is to be intended in a limiting sense, and that several variations and modifications are possible, which are well in the reach of the person skilled in the art and anyway fall within the scope of the invention as claimed in the appended claims.

For instance, even if in the embodiment described reference has been made to the application of the method and the apparatus according to the invention to a working station where only some items selected in spot manner are picked from the transport line, it cannot be excluded that said method and said apparatus can be used in applications in which all items advancing on the transport line are picked from the line and subsequently reintroduced thereon, the gap left by an item that has just been picked being exploited in order to reintroduce an item that had been previously picked and had already undergone the desired operations.

The invention claimed is:

1. A method for transferring items from a transport line along which a plurality of items advance in line and close to each other along an advance direction, comprising:
    picking a first item of the plurality of items from the transport line with first engaging elements of a transferring device, and
    placing a second item onto the transport line with second engaging elements of the transferring device, into a gap left by the first item after the first item has been picked,
    wherein the second item is placed onto the transport line at a time immediately following a time at which the first item has been picked from the transport line, and
    wherein, during said steps of picking a first item and placing a second item, the transferring device is moved along a first direction, which is substantially parallel to the advance direction of the transport line, at a speed that is substantially the same as an advancing speed of the transport line.

2. The method according to claim 1, wherein the method comprises:
    reintroducing onto the transport line a third item, wherein the third item is the first item that has been previously picked from the transport line.

3. An apparatus for transferring items from a transport line, along which a plurality of items advance in line and close to each other, and to the transport line, the apparatus comprising a transferring device, the transferring device being provided with first engaging elements designed for selectively engaging/releasing a first item of the plurality of items and with second engaging elements designed for selectively engaging/releasing a second item of the plurality of items, wherein the first engaging elements are switchable from an engaging position to a releasing position, and vice versa, and the second engaging elements are switchable from an engaging position to a releasing position, and vice versa, wherein the transferring device is carried by a supporting arm, which is movable in order to be moved, between a first position in which the first engaging elements are aligned with a given point of the transport line for picking the first item from the transport line, and a second position in which the second engaging elements are aligned with the given point of the transport line for introducing the second item onto the transport line, into the gap left by the first item, wherein the supporting arm is movable along at least two different directions on a plane parallel to a plane on which the transport line advances, a first direction of the at least two different directions being substantially parallel to an advance direction of the transport line at the location of the apparatus and a second direction of the at least two different directions being transverse to the advance direction of the transport line at the location of the apparatus, and wherein, when the supporting arm is moved between said first position and said second position, the supporting arm is also moved along the first direction, which is substantially parallel to the advance direction of the transport line at the location of the apparatus, at a speed that is substantially the same as an advancing speed of the transport line.

4. The apparatus according to claim 3, wherein the transferring device includes a plate that is secured to the supporting arm and on which the first engaging elements are mounted adjacent to the second engaging elements.

5. The apparatus according to claim 3, wherein the supporting arm is also movable along a direction substantially perpendicular to the plane on which the transport line advances.

6. The apparatus according to claim 3, further comprising a controller for controlling movements of the supporting arm as well as for controlling switching of the first and second engaging elements from their engaging position to their releasing position, and vice versa.

7. The apparatus according to claim 6, comprising a detecting device, suitable to detect the position and/or speed of a conveyor belt of the transport line and to transmit detected data to the controller.

8. The apparatus according to claim 6, comprising a sensor, suitable to detect passage of the items carried by the transport line and to transmit detected information to the controller.

9. The apparatus according to claim 6, comprising a detecting device, suitable to detect a speed of the transport line and to transmit detected data to the controller.

\* \* \* \* \*